O. C. COGGINS.
Carriage-Spring.

No. 225,970　　　　　Patented Mar. 30, 1880.

WITNESSES:　　　　　　　　INVENTOR:

UNITED STATES PATENT OFFICE.

O. CHESTER COGGINS, OF NEW HAVEN, CONNECTICUT.

CARRIAGE-SPRING.

SPECIFICATION forming part of Letters Patent No. 225,970, dated March 30, 1880.

Application filed January 30, 1880.

*To all whom it may concern:*

Be it known that I, O. CHESTER COGGINS, of New Haven, in the county of New Haven and State of Connecticut, have invented a new and useful Improvement in Carriage-Springs, of which the following is a specification.

My invention relates more particularly to side springs, and to the means for connecting them to the end springs.

The improvement consists in making a trunnion on either one or both ends of the springs, and in the means for connecting the several springs together.

Figure 1:
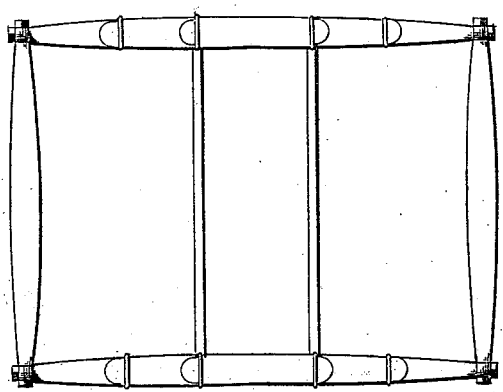
Figure 2:
Figure 3:
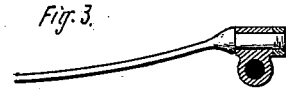
Figures 4, 5:

In the drawings, Figure 1 shows the side and end springs connected together. Fig. 2 shows a portion of a side spring with a trunnion on its end, a vertical section of a nut on the end of the trunnion, and a vertical section of the coupling. Fig. 3 shows a portion of an end spring terminating in a trunnion, a vertical section of a nut on its end, and a vertical section of the coupling. Fig. 4 is a view of the coupling; and Fig. 5 shows a portion of a side spring having a trunnion with a thread on its end.

To enable others to make my improved spring, I will describe the mode of making it in detail.

The lower or longer leaf of the spring, if more than one leaf is used, is cut to the required length, and a portion of the edges of the leaf is cut out, leaving a central piece on the end of the leaf, the width of which equals or is a little greater than the diameter of the trunnion to be made, and the length of which is twice that of the trunnion. This central piece is turned over, welded, and rounded, forming a trunnion or journal.

The trunnions may be made of round bars of iron or steel by flattening the ends of the bars to the width of the spring and riveting, bolting, or welding the bars to the spring, and be finished as before described. The semi-elliptical side and end springs are formed in the usual and well-known manner.

If a side spring has a trunnion formed only on one of its ends the end having no trunnion is rigidly attached to the end spring.

The trunnions may be made a little longer than is required to pass through the coupling and nut, and a short spiral spring may be placed on the trunnion between the coupling and shoulder on the spring.

The coupling is made in the form shown in Fig. 4, and has two holes at right angles to each other and in different parallel planes. The holes are of the proper size to receive the trunnions. The couplings are held on the trunnions by nuts on their ends, as shown in section in Figs. 2 and 3.

If the side springs are very long and very much curved the couplings should be correspondingly lengthened, to increase the distance between their lower ends as they turn.

Constructed and coupled as above described and as shown, there is no torsion of any of the springs by any pressure to which they are subjected, and no motion of the carriage-body attached to the side springs in relation to the running-gear is possible except as one or more of the springs are bent.

Having described my improvements, what I claim as new, and desire to secure by Letters Patent, is—

1. The semi-elliptical side springs, terminating in trunnions having nuts on their ends, and the semi-elliptical end springs, terminating in trunnions having nuts on their ends, the said springs being connected together by means of couplings inclosing the trunnions between the nuts and shoulders, each coupling having two holes at right angles to each other and in different parallel planes, substantially as shown and set forth.

2. The semi-elliptical side springs, terminating in trunnions having nuts on their ends, and the semi-elliptical end springs, terminating in trunnions having nuts on their ends, in combination with couplings to support the carriage-body, substantially as shown and set forth.

O. CHESTER COGGINS.

Witnesses:
GEORGE TERRY,
GEORGE M. HUBBARD.